US012702607B1

(12) United States Patent
Skraber

(10) Patent No.: US 12,702,607 B1
(45) Date of Patent: Aug. 11, 2026

(54) ADJUSTABLE PATIENT EXTREMITY SUPPORT SYSTEM

(71) Applicant: Geoffrey Skraber, Auburn, CA (US)

(72) Inventor: Geoffrey Skraber, Auburn, CA (US)

( * ) Notice: Subject to any disclaimer, the term of this patent is extended or adjusted under 35 U.S.C. 154(b) by 163 days.

(21) Appl. No.: 18/470,711

(22) Filed: Sep. 20, 2023

Related U.S. Application Data

(60) Provisional application No. 63/376,364, filed on Sep. 20, 2022.

(51) Int. Cl.
*A61G 7/075* (2006.01)
*A61G 5/12* (2006.01)
*A61G 13/12* (2006.01)

(52) U.S. Cl.
CPC ............. *A61G 7/075* (2013.01); *A61G 5/125* (2016.11); *A61G 13/12* (2013.01); *A61G 2200/327* (2013.01); *A61G 2200/34* (2013.01)

(58) Field of Classification Search
CPC ........ A61G 7/075; A61G 7/065; A61G 5/125; A61G 5/12; A61G 7/1055; A61G 7/1049; A61G 7/192; A61G 7/1082; A61G 13/1235; A61G 13/1205; A61G 13/12; A61G 7/1092; A61G 2200/327; A61G 2200/32; A61G 2200/34
USPC ............................................ 5/646, 623, 621
See application file for complete search history.

(56) References Cited

U.S. PATENT DOCUMENTS 3,403,675 A * 10/1968 Carr ..................... A61H 1/0229 602/32
4,579,324 A * 4/1986 McConnell ............ A61G 13/10 5/618
4,702,465 A * 10/1987 McConnell ............ A61G 13/12 5/648
4,840,363 A * 6/1989 McConnell ............ A61G 13/12 5/624
5,957,135 A * 9/1999 Molina .................. A61G 13/12 128/845

* cited by examiner

*Primary Examiner* — Robert G Santos
(74) *Attorney, Agent, or Firm* — IceMiller LLP

(57) ABSTRACT

The present invention relates to an extremity support system for providing an extremity support suspension on one or both sides of a patient support, comprising: (a) a main support arm adapted to be secured above the patient support, the patient support having a central axis and first and second lateral sides, the main support comprising a hub portion connected to the support arm so as to be disposed along the central axis; (b) a lateral support arm extending from and movably attached to the hub portion on the first lateral side, and configured for being positioned at various angles with respect to the central axis; and (c) an extremity support member suspended from the lateral support arm. The present invention also includes methods of supporting an extremity of a patient on a patient support; and includes methods of adjusting the position of the extremities and releasing the patient from the extremity support.

18 Claims, 20 Drawing Sheets

ADJUSTABLE PATIENT EXTREMITY SUPPORT SYSTEM

RELATED APPLICATION DATA

This application claims the priority benefit of U.S. Provisional Application Ser. No. 63/376,364, filed Sep. 20, 2022, which is hereby incorporated in its entirety herein by reference.

FIELD OF THE INVENTION

The invention relates generally to an extremity support system for providing an extremity support suspension on one or both sides of a patient support, and methods of supporting an extremity of a patient on a patient support; and includes methods of adjusting the position of the extremities and releasing the patient from the extremity support.

BACKGROUND OF THE INVENTION

In the United States, 400,000 patients receive burn care annually, many involving extremities (arms/hands/legs/feet) and requiring skin grafting. Burn scar contracture is a functionally debilitating consequence of skin grafting in the extremities when the limbs are not properly positioned while the skin grafts are healing. Rates of contracture are reported as high as 56%. Traditionally casts and splints have been used to maintain positioning however, they make skin graft care clumsy and require frequent replacement due to contamination.

There remains a need to provide for the positioning of burned extremities to promote skin graft healing while facilitating patient treatment by doctors and nurses while in a supported laying or seated position, movement to and from that supported position (such as for imaging, ancillary care and the like), as well as to promote patient comfort while in that supported position.

This need includes the need to provide an assembly system for the post-op patient that has undergone a surgical procedure to release the scarred down burned skin and thus inserting a skin graft where the release was gained, and specifically to provide a means of elevation and abduction of the upper extremities through the use of a suspension assembly.

SUMMARY OF THE INVENTION

The present invention includes an extremity support system and extremity support method that may be beneficially applied to burn patients as an alternative to splinting by generally leaving the extremity unencumbered and providing the burn patient comfortable extremity support while affording relatively complete range of motion thereby combating skin graft contracture while facilitating convenient skin graft care for doctors and nurses.

This assembly system may be used for the post-op patient that has undergone a surgical procedure to release the scarred down burned skin and thus inserting a skin graft where the release was gained, and to provide a means of elevation and abduction of the upper extremities through the use of a suspension assembly.

A first general embodiment of the present invention may be described generally as an extremity support system for providing an extremity support suspension on at least one side of a patient support, comprising: (a) a main support arm adapted to be secured above the patient support, the patient support having a central axis and first and second lateral sides, the main support comprising a hub portion connected to the support arm so as to be disposed along the central axis; (b) a lateral support arm extending from and movably attached to the hub portion on the first lateral side, and configured for being positioned at various angles with respect to the central axis; and (c) an extremity support member suspended from the lateral support arm.

In some embodiments, the patient support may comprise a bed or chair and wherein the main support arm is secured above the patient support.

In still other embodiments, the lateral support arm may be adapted to be variably positioned at an angle between about 0 degrees to about 115 degrees with respect to the central axis.

In some embodiments, the hub portion may comprise a horizontal lateral slot and the lateral support comprises a rigid planar member swivelably affixed within and extending from the horizontal lateral slot so that it may be variably positioned at an angle between about 0 degrees to about 115 degrees with respect to the central axis.

In other embodiments, the system comprising a support suspension arrangement supporting the extremity support member, and may be in the form of straps, ropes or bands, or similar mechanical arrangement to provide a suspensory support to the extremity support member. The straps, ropes or bands may be adjustable along the longitudinal axis of the lateral support arm, and may comprise at least one fixture to permit elevation and/or angular adjustment of the extremity support member. This may be provided in the form of a suspension arrangement that comprises four nylon or polypropylene straps each strap having a fixture to permit elevation and/or angular adjustment of the extremity support member.

In some embodiments, the extremity support member is of sufficient size to support a human arm or leg; and may be rigid and planar.

In other embodiments, the extremity support member is of sufficient size to support a human arm or leg; and may comprise a tensed fabric to provide a relatively flexible extremity support surface.

Yet other embodiments may include an extremity support member that comprises a sling suspended from the lateral support arm by a suspension arrangement comprising straps, ropes or bands.

In still other embodiments, the extremity support member may be in the form of a fabric sling suspended from the lateral support arm by a suspension arrangement comprising straps, ropes or bands.

The suspension arrangement may optionally comprise at least one quick release fixture to permit disconnection of the extremity support member from the suspension arrangement, to permit the patient to move from the patient support.

A second general embodiment of the present invention may be described generally as an extremity support system for providing an extremity support suspension on one or two sides of a patient support, comprising: (a) a main support arm adapted to be secured above the patient support, the patient support having a central axis and first and second lateral sides, the main support comprising a hub portion connected to the support arm so as to be disposed along the central axis; (b) a first lateral support arm extending from and movably attached to the hub portion on the first lateral side, and configured for being positioned at various angles with respect to the central axis; (c) a first extremity support member suspended from the first lateral support arm; (d) a second lateral support arm extending from and movably attached to the hub portion on the second lateral side, and configured for being positioned at various angles with respect to the central axis; and (e) a second extremity support member suspended from the second lateral support arm.

Other variations and embodiments of this second general embodiment of the present invention include those described above with respect to the first general embodiment, and may be independently applied to this second general embodiment.

In still other embodiments, the first lateral support arm is adapted to be variably positioned at an angle between about 0 degrees to about 115 degrees with respect to the central axis, and wherein the second lateral support arm is adapted to be variably positioned at an angle between about 0 degrees to about 115 degrees with respect to the central axis.

In other embodiments, the hub portion may comprise opposed first and second horizontal lateral slots wherein the first lateral support comprises a first rigid planar member swivelably affixed within and extending from the first horizontal lateral slot so that it may be variably positioned at an angle between about 0 degrees to about 115 degrees with respect to the central axis, and wherein the second lateral support comprises a second rigid planar member swivelably affixed within and extending from the second horizontal lateral slot so that it may be variably positioned at an angle between about 0 degrees to about 115 degrees with respect to the central axis.

In still other embodiments, the system comprises a first support suspension arrangement supporting the first extremity support member, and a second support suspension arrangement supporting the second extremity support member, and wherein the first lateral support arm has a first longitudinal axis and wherein the first support suspension arrangement comprises first straps, ropes or bands that are adjustable along the first longitudinal axis, and wherein the second lateral support arm has a second longitudinal axis and wherein the second support suspension arrangement comprises second straps, ropes or bands that are adjustable along the second longitudinal axis.

In some embodiments, the first and second suspension arrangements may optionally include at least one quick release fixture to permit disconnection of the first or second extremity support member from the first or second suspension arrangement.

Yet other embodiments provide at least one fixture to permit elevation and/or angular adjustment of the first or second extremity support member.

In some embodiments, the first and second extremity support members may be rigid and be of sufficient size and length to support a human arm or leg, while in other embodiments, the first and second extremity support members may comprise a tensed fabric extremity support surface.

In cases where the first and second extremity support members are rigid or are in the form of a tensed fabric extremity support surface, the first and second extremity support members may be suspended from the respective the first and second lateral support arms by respective suspension arrangements comprising straps, ropes or bands. In such embodiments, the suspension arrangement may additionally comprise at least one fixture to permit elevation and/or angular adjustment of the first and second extremity support members. As an example, the first and second suspension arrangements may comprise four nylon or polypropylene straps each strap having a fixture to permit respective elevation and/or angular adjustment of the first and second extremity support members.

In still other embodiments, the first and second extremity support members may be in the form of slings of sufficient size to support a human arm or leg. In these embodiments, the first and second slings may be suspended from the respective first and second lateral support arms by a suspension arrangement comprising straps, ropes or bands; and these may comprise at least one fixture to permit elevation and/or angular adjustment of the first and second slings. Other embodiments may include the provision of at least one quick release fixture to permit disconnection of the first and/or second slings, to permit the patient to move from the patient support.

The assembly of the extremity support system may be comprised of an aluminum hub portion mounted above the patient by means of an existing overhead trapeze type system or equivalent system supported on the floor or even from the ceiling above the patient support. The assembly in some embodiments provides straps to affixed to support a U-shaped fabric-supporting frame such that the patient's extremity may then be elevated and or abducted or adducted per the required effect, for the patient's best outcome. The suspension system allows for a range of 0 degrees from body to greater than 90 degrees at the shoulder away from the body. Along with the ability to ascertain abduction and adduction it also allows for the upper extremity to be elevated while in use.

In one embodiment, the invention comprises an arm suspension burn sling system including a first arm configured for positioning at a first side of an arm suspension system; a second configured for positioning at a second side of an arm suspension system; and a body (hub) connecting the first arm to the second arm for adjustment of the first arm and second arm along an adjustment plane; and wherein the first arm and second arm adjust from the body between 0 degrees to (abduction) 115 degrees; and wherein the body (hub) is attached to a stationary member (overhead frame from hospital bed), supporting the first (left) and second (right) arms resulting in a suspended arm system.

In some embodiments the connecting member (i.e., the U-shaped frame supporting fabric holds the actual arms) may capture and hold the arm(s) for suspension.

In other embodiments the system may include a strap system (e.g., nylon straps that are attached to the upper articulating structures (such as the lateral support arm(s)) and the lower U-shaped frame) may be comprised of four (4) nylon or polypropylene straps with buckles to allow elevation adjustments of the first and/or second extremity support members.

The present invention further includes embodiments of a method of using the one-sided or two-sided embodiments of the invention for patient treatment and care.

Embodiments of the present invention include methods of supporting an extremity of a patient on a patient support by using an extremity support system of the present invention, comprising the general steps: (a) providing an extremity support system comprising: (i) a main support arm adapted to be secured above the patient support, the patient support having a central axis and first and second lateral sides, the main support comprising a hub portion connected to the support arm so as to be disposed along the central axis; (ii) A lateral support arm extending from and movably attached to the hub portion on the first lateral side, and configured for being positioned at various angles with respect to the central axis; and (iii) An extremity support member suspended from the lateral support arm; and (b) placing the patient on the patient support and placing the patient's extremity on the extremity support member.

Still other embodiments of the present invention include methods of supporting an extremity of a patient on a patient support by using an extremity support system of the present invention, comprising the steps: (a) providing an extremity support system comprising: (i) a main support arm adapted to be secured above the patient support, the patient support having a central axis and first and second lateral sides, the main support comprising a hub portion connected to the support arm so as to be disposed along the central axis, (ii) a first lateral support arm extending from and movably attached to the hub portion on the first lateral side, and configured for being positioned at various angles with respect to the central axis, (iii) a first extremity support member suspended from the first lateral support arm, (iv) a second lateral support arm extending from and movably attached to the hub portion on the second lateral side, and configured for being positioned at various angles with respect to the central axis, (v) a second extremity support member suspended from the second lateral support arm; and (b) placing the patient on the patient support and placing the patient's first extremity on the first extremity support member, and the patient's second extremity on the second extremity support member.

The methods of the present invention may be carried out by having the main support arm secured above a patient support comprising a bed or chair.

The methods of the present invention may include the additional step of changing the angle of the lateral support arm(s) with respect to the central axis, such changing the angle of at least one of the first and second lateral support arms with respect to the central axis.

The methods of the present invention may be carried out by having the extremity support member be either rigid or in the form of a tensed fabric and be suspended from the lateral support arm by a suspension arrangement having fixtures to permit the elevational and/or angular adjustment of the extremity support member, the method comprising the additional step of adjusting the elevation or angle of the extremity support member.

The methods of the present invention may be carried out by having a first extremity support member be suspended from a first lateral support arm by a first suspension arrangement having fixtures to permit the elevational and/or angular adjustment of the first extremity support member, and a second extremity support member is suspended from a second lateral support arm by a second suspension arrangement having fixtures to permit the elevational and/or angular adjustment of the second extremity support member, the method comprising the additional step of adjusting the elevation or angle of at least one of the first or second extremity support members.

The methods of the present invention may be carried out by having the extremity support system comprise at least one quick release fixture to permit disconnection of the extremity support member(s), the method comprising the additional step of disconnecting the extremity support member(s) from the lateral support arm(s).

BRIEF DESCRIPTION OF THE DRAWINGS

The embodiments described herein and other features, advantages, and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF EMBODIMENTS OF THE INVENTION

Figure 1:
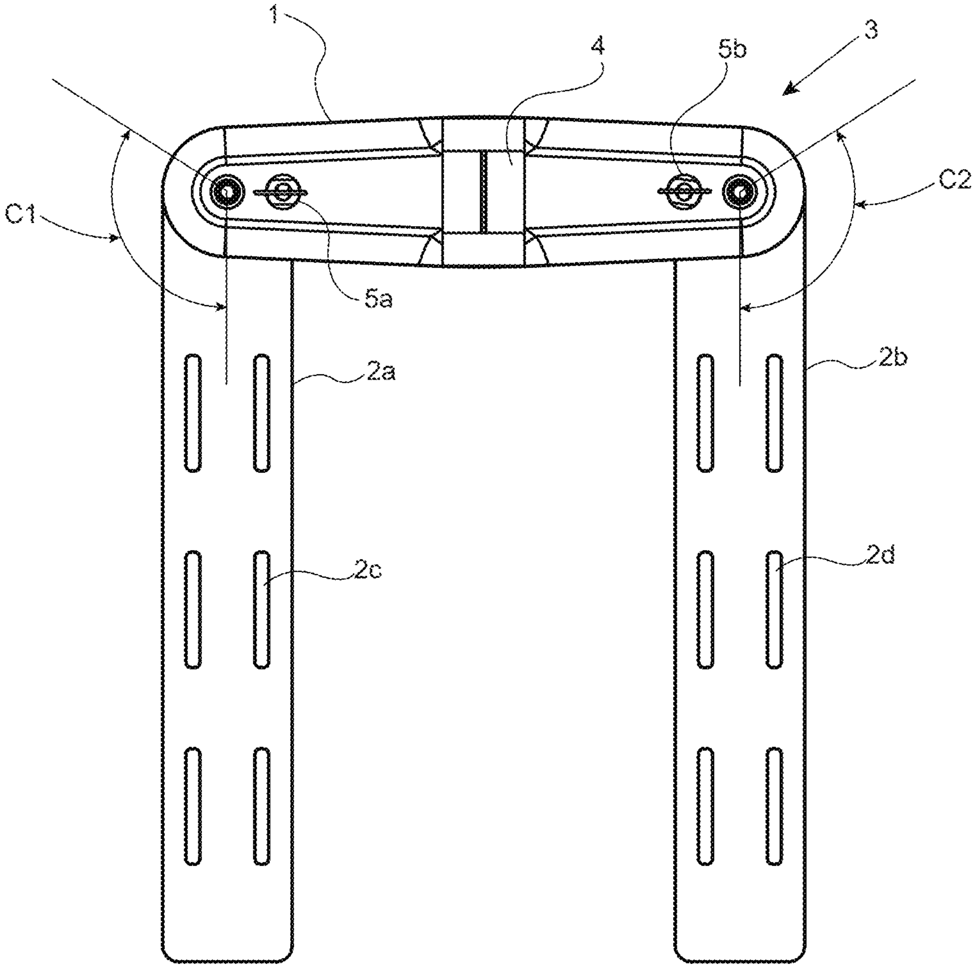
FIG. 1 is a top side plan view of a hub portion from which lateral support arms extend and are movably attached so as to be positioned at various angles with respect to its central axis, in accordance with one embodiment of a hub portion assembly of an extremity support system of the present invention.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 is a top side plan view of a hub portion assembly 3 comprising a hub portion 1 from which lateral support arms 2*a* and 2*b* extend and are movably attached so as to be positioned at various angles with respect to its central axis A (typically oriented along the longitudinal axis of the patient so as to place the extremities of the patient on either side of central axis A), and such that lateral support arms 2*a* and 2*b* are movably adjustable respectively about rotation axes D1 and D2 (as may be appreciated from FIGS. 2-4), i.e., along respective arcs C1 and C2, to provide an adjustable extremity support system of the present invention. It will be appreciated from the following description that the hub portion assembly 3 may comprise a hub portion 1 adapted to support and permit the adjustment of only a single lateral support arm, so as to provide a single-sided variant.

FIG. 1 also shows how lateral support arms 2*a* and 2*b* may be provided with a mechanical arrangement to permit the securing and placement of a suspension arrangement, such as a series of straps such as through one or more slots, such as slot 2*c* in lateral support arm 2*a* and as slot 2*d* in lateral support arm 2*b*. Such an arrangement of slot and the like permit a series of straps, ropes or bands to distend from the lateral support arms 2*a* and 2*b* to engage and support an extremity support member suspended from each lateral support arm (not shown). Other mechanical equivalent arrangements or fixtures may be applied to capture one or more such straps, ropes or bands, and to hold them at a position or range of positions along the respective longitudinal axes, respectively B1 and B2. These may include opposing Velcro attachments or snaps on the lateral support arms 2*a* and 2*b* and on the straps, ropes or bands such that the position of the straps, ropes or bands may be adjusted and fixed generally along the respective longitudinal axes B1 and B2.

Also shown in FIG. 1 is the hub portion clamp 4 that may be used to attach the hub portion 1 to a support positioned above the patient support, such as above a hospital bed, such that the central axis A of the hub portion is oriented along the longitudinal axis of the reclining patient so as to place the extremities of the patient on either side of central axis A. This view also shows the position of lock pin housings 5*a* and 5*b* that are described in more detail in FIGS. 18-23, and that are adapted to accept lock pins such as locking pin 6 described in more detail in FIGS. 24-27.

Figure 2:
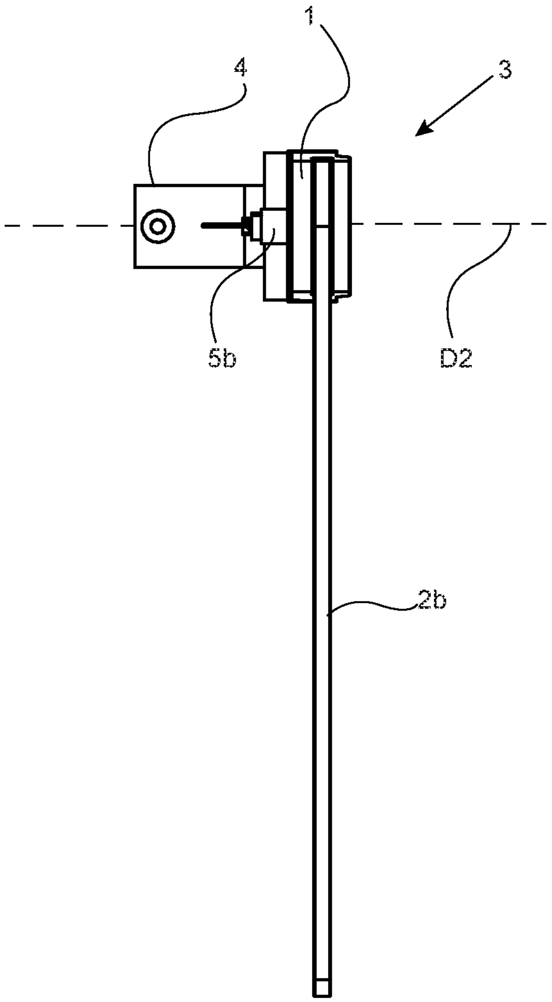
FIG. 2 is a first lateral side elevation view of a hub portion from which lateral support arms extend and are movably attached so as to be positioned at various angles with respect to its central axis, in accordance with one embodiment of a hub portion assembly of an extremity support system of the present invention.

FIG. 2 is a first lateral side elevation view of a hub portion assembly 3 comprising a hub portion 1 from which lateral support arm 2*b* extends to be movably attached so as to be positioned at various angles with respect to its central axis A, and such that lateral support arm 2*b* is movably adjustable respectively about rotation axis D2 (as may be appreciated from FIGS. 3 and 4), i.e., along respective arc C2 with respect to central axis A. Also shown in this view is hub portion clamp 4 described in more detail in FIGS. 14-17.

Figure 3:
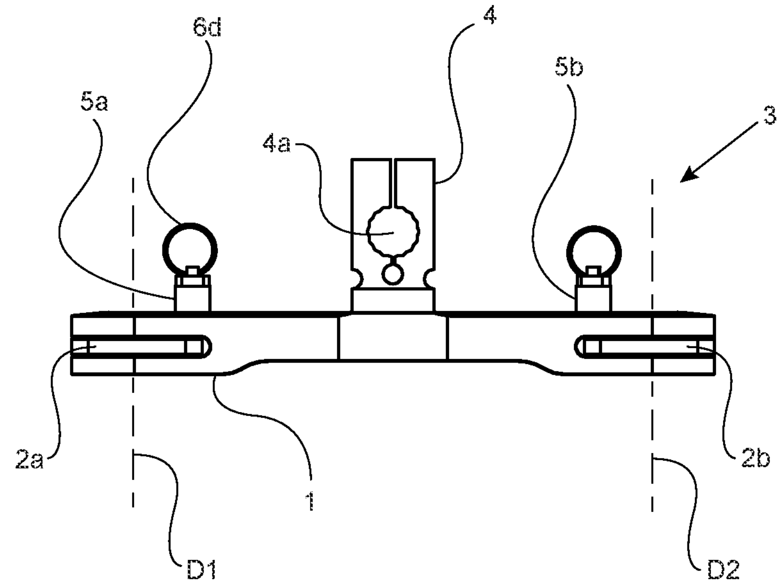
FIG. 3 is a first longitudinal side elevation view of a hub portion from which lateral support arms extend and are movably attached so as to be positioned at various angles with respect to its central axis, in accordance with one embodiment of a hub portion assembly of an extremity support system of the present invention.

FIG. 3 is a first longitudinal side elevation view of a hub portion assembly 3 comprising a hub portion 1 from which lateral support arms 2*a* and 2*b* extend and are movably attached hub portion 1 from within slots 1*e* and 1*f* in hub portion 1 as may be further appreciated from FIGS. 5-10. This Figure shows the position of lock pin housings 5*a* and 5*b* that accept lock pins, such as lock pin lock pin 6 that may be grasped using lock pin ring, such as lock pin ring 6*d*.

Figure 4:
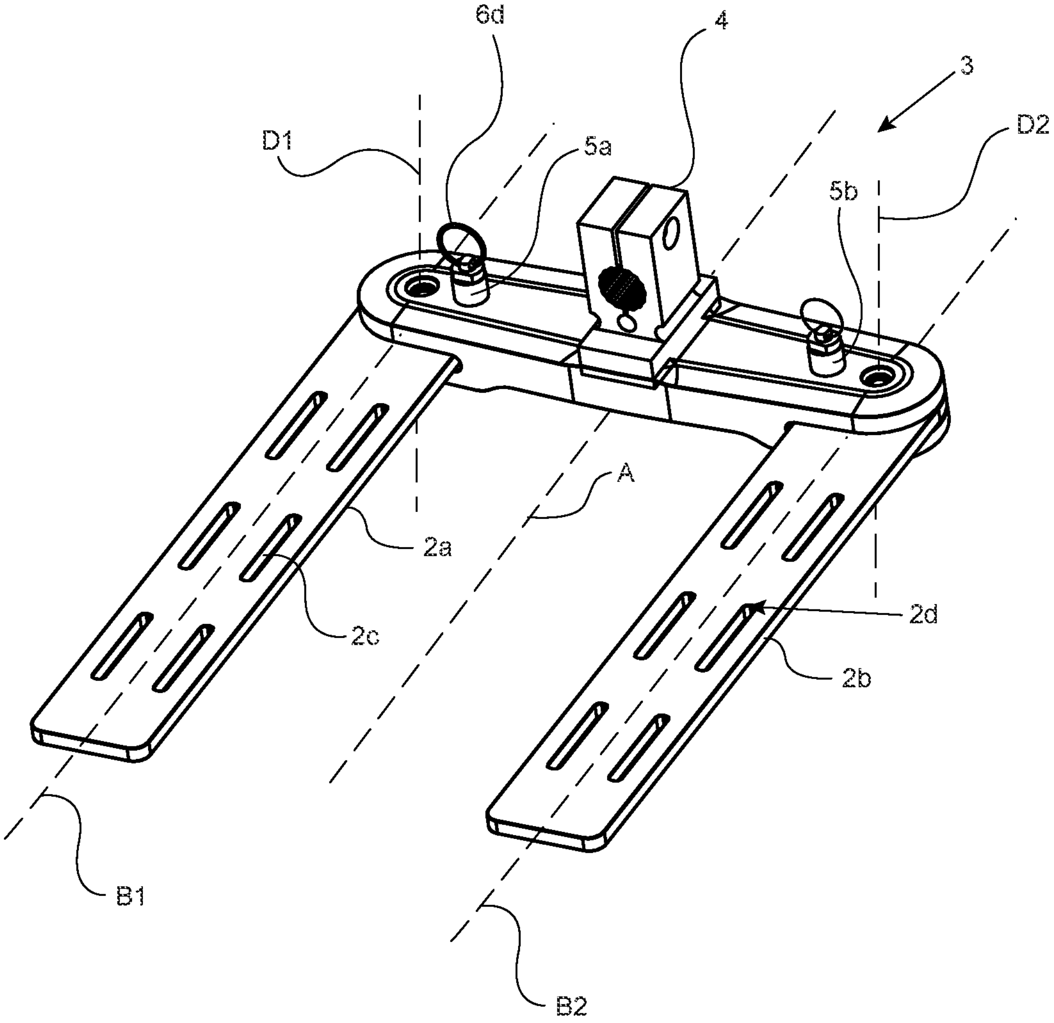
FIG. 4 is a top perspective view of a hub portion from which lateral support arms extend and are movably attached so as to be positioned at various angles with respect to its central axis, in accordance with one embodiment of a hub portion assembly of an extremity support system of the present invention.

FIG. 4 is a top perspective view of a hub portion assembly 3 comprising a hub portion 1 from which lateral support arms 2*a* and 2*b* extend and are movably to attached hub portion 1 from within slots 1*e* and 1*f* as may be appreciated from FIGS. 5-10. Also shown in this view is hub portion clamp 4 described in more detail in FIGS. 14-17. This Figure shows hub portion assembly 3 with lateral support arms 2*a* and 2*b* wherein their respective longitudinal axes B1 and B2 are in a position parallel to central axis A (i.e., at 0 degrees position with respect to central axis A). The position of lateral support arms 2*a* and 2*b* may be fixed by any suitable mechanical arrangement that permits the repositioning and temporary fixing of the position of lateral support arms 2*a* and/or 2*b* along respective arcs C1 and C2. This may be done for instance through use of and the locking pins, such as lock pin 6 described in more detail in FIGS. 24-27, by insertion into locking apertures 2*f* as may be as may be appreciated from FIGS. 11 through 13.

The lateral support arms 2*a* and 2*b* will typically be of a width such that ropes, straps or bands extending below them will be arranged to correspondingly support an extremity support member, typically of a length and width approximately corresponding to that of the lateral support arms, such that the extremity support member in turn supports a patient's extremity, whether an arm or leg.

FIGS. 5-9 describe hub portion 1 in greater detail.

Figure 5:
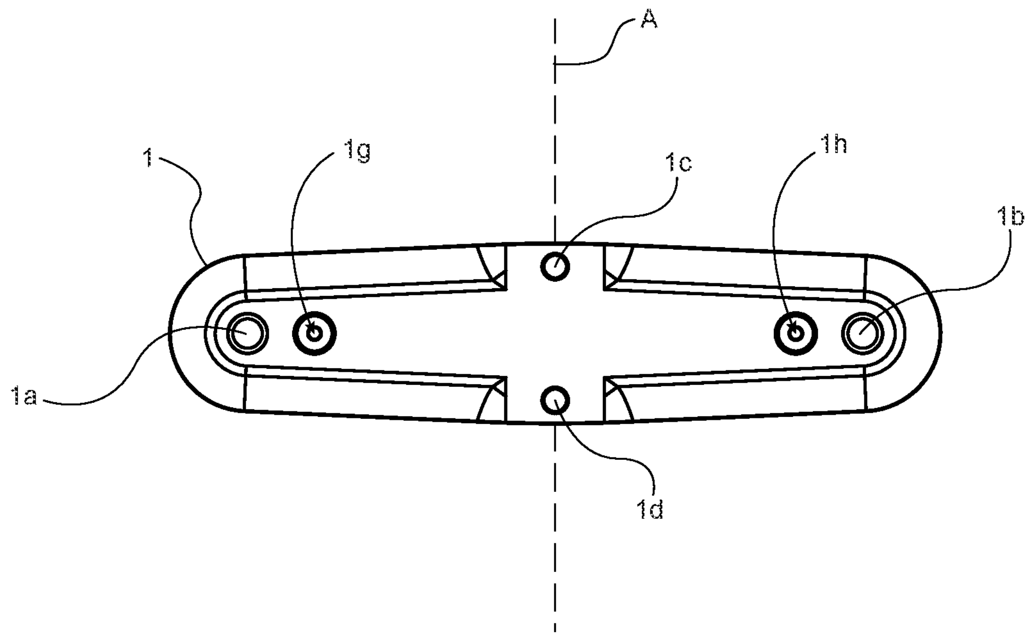
FIG. 5 is a top plan view of a hub portion defining its central axis, in accordance with one embodiment of an extremity support system of the present invention.

FIG. 5 is a top plan view of a hub portion 1 defining its central axis A and showing rotation apertures 1*a* and 1*b*, hub portion clamp mounting apertures 1*c* and 1*d*, and locking pin apertures 1*g* and 1*h*. Rotation apertures 1*a* and 1*b* are sized so as to accept respective inner bushings 8 described in more detail in FIGS. 28-31, and outer bushings 7 described in more detail in FIGS. 32-35, to provide a mechanical arrangement to facilitate the rotational movement of lateral support arms 2*a* and 2*b* with respect to hub portion 1.

Also shown in FIG. 5 are hub portion clamp mounting apertures 1*c* and 1*d* provided to accept fixtures to attach hub portion clamp 4 thereto, as may be further appreciated from FIGS. 14-17.

Figure 6:
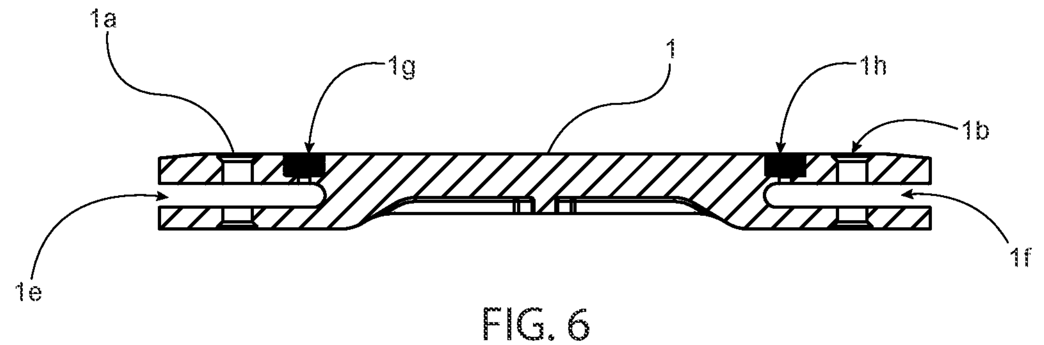
FIG. 6 is a longitudinal sectioned view, along line A-A of FIG. 5, of a hub portion defining its central axis, in accordance with one embodiment of an extremity support system of the present invention.
Figure 11:
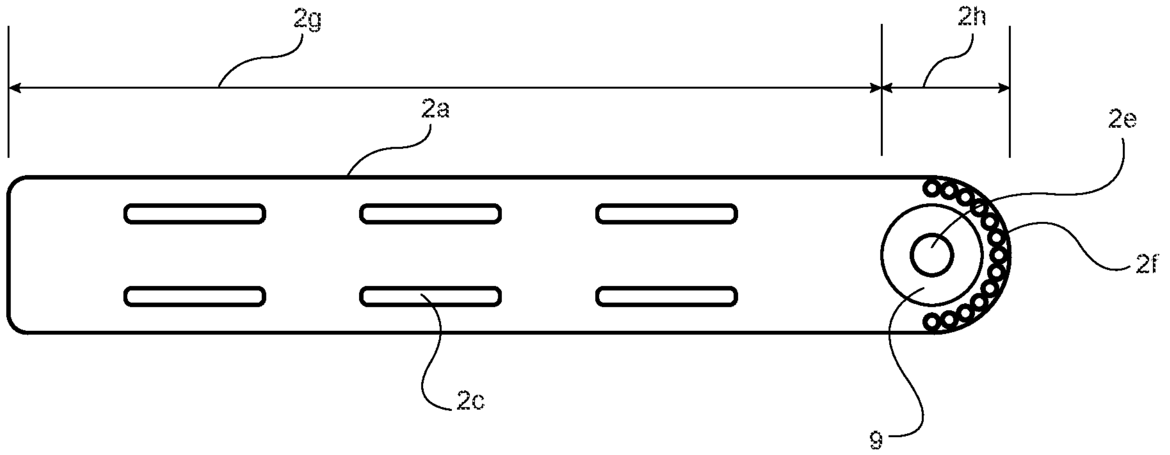
FIG. 11 is a top plan view of a lateral support arm defining its longitudinal axis, in accordance with one embodiment of an extremity support system of the present invention.
Figure 12:
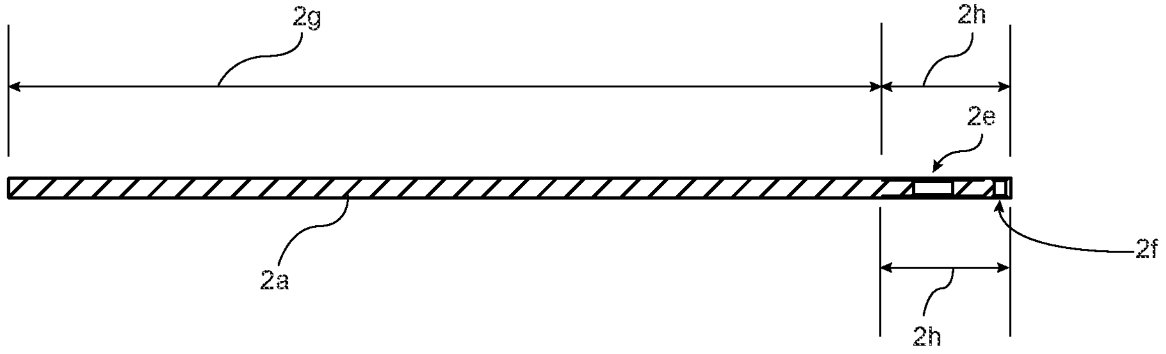
FIG. 12 is a longitudinal sectioned view, along line A-A of FIG. 12, of a lateral support arm, in accordance with one embodiment of an extremity support system of the present invention.
Figure 13:
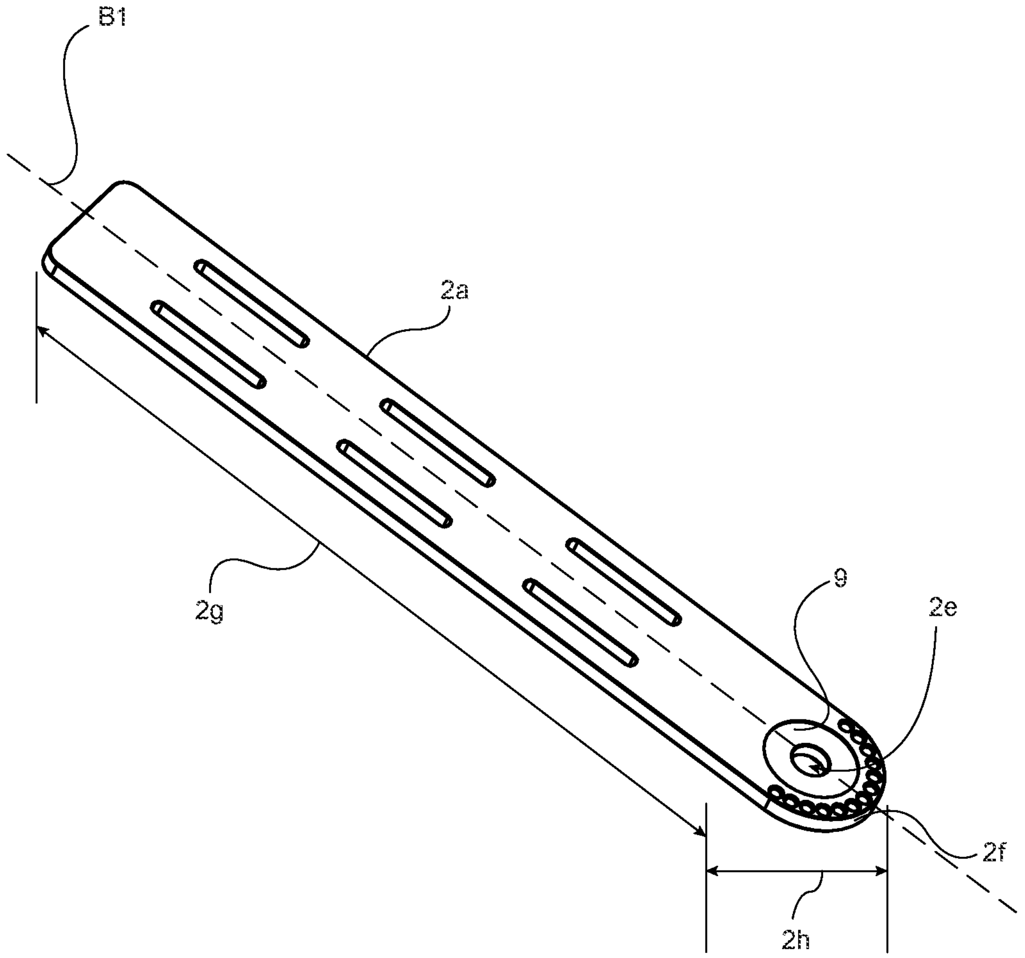
FIG. 13 is a top side perspective view of a lateral support arm defining its longitudinal axis, in accordance with one embodiment of an extremity support system of the present invention.
Figure 14:
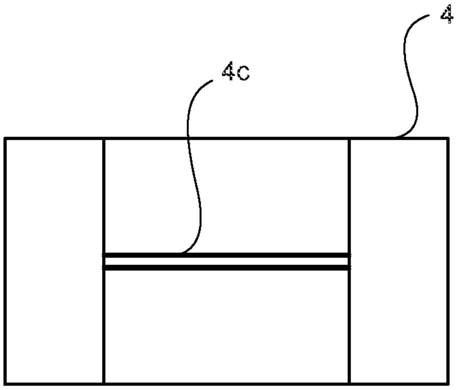
FIG. 14 is a top plan view of a hub portion clamp, in accordance with one embodiment of an extremity support system of the present invention.
Figure 15:
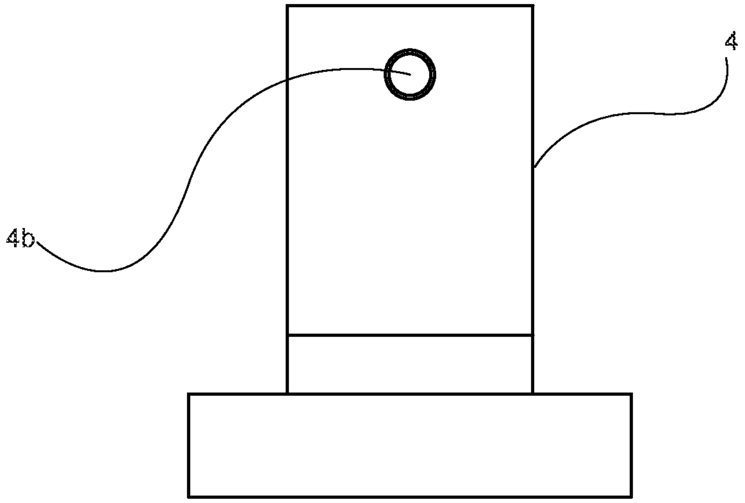
FIG. 15 is a lateral side elevation view of a hub portion clamp, in accordance with one embodiment of an extremity support system of the present invention.

This arrangement may be appreciated from the longitudinal sectioned view in FIG. 6 showing hub portion 1 having rotation apertures 1*a* and 1*b* extending therethrough and locking pin apertures 1*g* and 1 h extending from the top side of the hub portion 1 respectively into the spaces defined by rotation slots 1*e* and 1*f* that are sized so as to accept the respective rotational portion of the lateral support arms 2*a* and/or 2*b*, such as rotational portion 2*h* of lateral support arm 2*a*, as may be appreciated from FIGS. 11 through 13. Lateral support arm 2*b* may be likewise constructed and provided in rotation slot 1*f* to create a two-sided embodiment.

Figure 7:
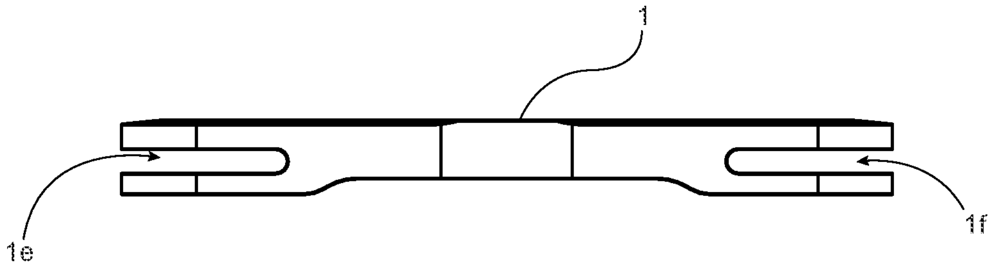
FIG. 7 is a longitudinal side elevation view of a hub portion defining its central axis, in accordance with one embodiment of an extremity support system of the present invention.

FIG. 7 is a longitudinal side elevation view of a hub portion 1, showing another view of rotation slots 1*e* and 1*f*.

Figure 8:
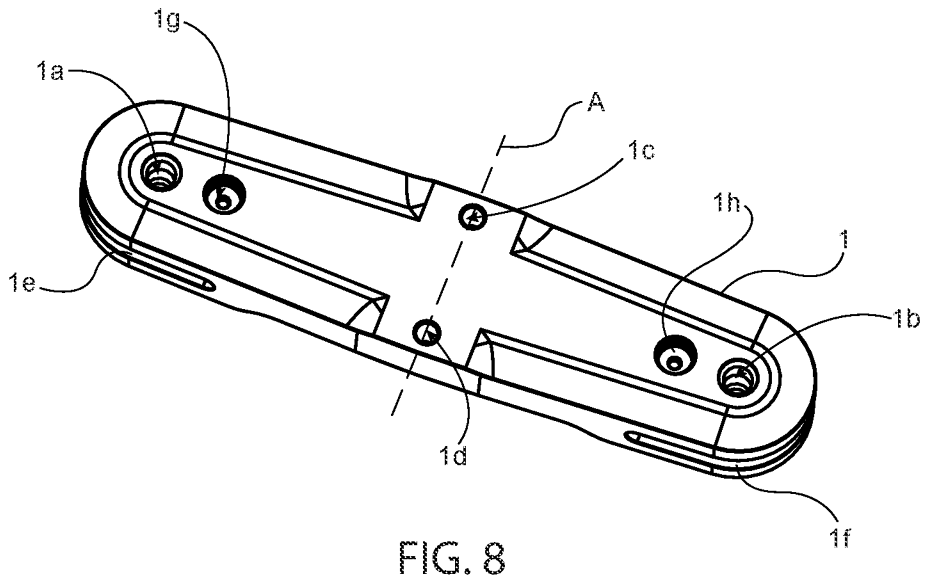
FIG. 8 is a top side perspective view of a hub portion defining its central axis, in accordance with one embodiment of an extremity support system of the present invention.

FIG. 8 is a perspective view of a hub portion 1 wherein like numerals refer to elements and features described in the earlier Figures.

Figure 9:
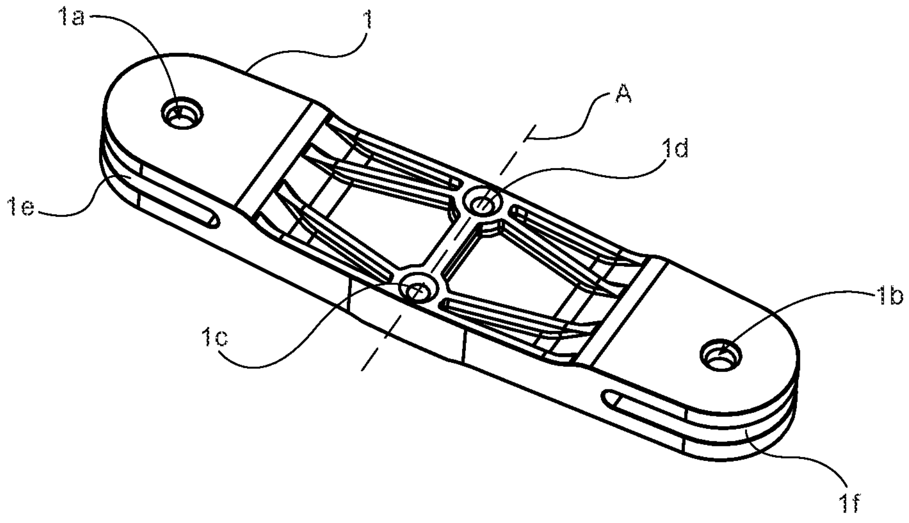
FIG. 9 is an underside perspective view of a hub portion defining its central axis, in accordance with one embodiment of an extremity support system of the present invention.

FIG. 9 is an underside perspective view of a hub portion 1 wherein like numerals refer to elements and features described in the earlier Figures. This view shows more clearly the interior contour of rotation apertures 1*a* and 1*b* that are sized so as to accept and retain inner bushings 8 as described in more detail in FIGS. 28-31, and outer bushings 7 as described in more detail in FIGS. 32-35, to facilitate the rotational movement of lateral support arms 2*a* and 2*b* with respect to hub portion 1.

Pairs of outer bushings 7 may be inserted and maintained in place by being press-fit into the relatively wider lateral arm mounting apertures, such as lateral arm mounting aperture 2*e* in lateral support arm 2*a*, as shown in FIGS. 11 through 13.

After positioning the rotational portions of lateral support arms 2*a* and 2*b*, such as rotational portion 2*h* of lateral support arm 2*a* as shown in FIGS. 11 through 13, the inner bushings 8 then may be inserted and maintained in place by being press-fit into the relatively narrow central portions of respective rotation apertures 1*a* and 1*b* of hub portion 1, to create a rotationally captive arrangement that permits arcuate movement of the lateral support arms 2*a* and/or 2*b* with respect to hub portion 1.

FIG. 9 also shows hub portion clamp mounting apertures 1*c* and 1*d* that may be provided to accept a fixture, such as a screw, to attach hub portion clamp 4 thereto.

Figure 10:
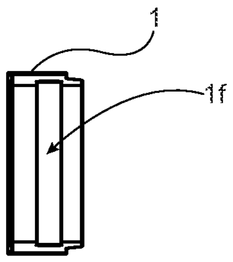
FIG. 10 is a lateral side elevation view of a hub portion, in accordance with one embodiment of an extremity support system of the present invention.

FIG. 10 is a lateral side elevation view of a hub portion 1, in accordance with one embodiment of an extremity support system of the present invention.

FIGS. 11-13 show various views of one of the lateral support arms 2*a*. FIG. 11 shows lateral support arm 2*a* having an extension portion 2*g* and rotational portion 2*h* of lateral support arm 2*a*. Extension portion 2*g* is also provided with several rope-, band- or strap-mounting slots 2*c* that permit the attachment, positioning and adjustment of ropes, bands or straps along the longitudinal axis B1 thereof by providing straps extending therethrough to suspend a series of two or more straps in each of the two parallel series of slots 2*c*. The ropes, bands or straps in turn suspend an extremity support member suspended from one or both of the lateral support arms 2*a* and 2*b*, as is more clearly shown in FIGS. 42 and 43.

FIGS. 11-13 also show the locking apertures 2*f* arrayed around the perimeter of the top side of rotational portion 2*h* so as to accept a locking pin 6. FIGS. 11 and 13 also show the position of washer ring 9 provided to facilitate ease of rotation of lateral support arm 2*a* in rotation slot 1*e*.

Figure 16:
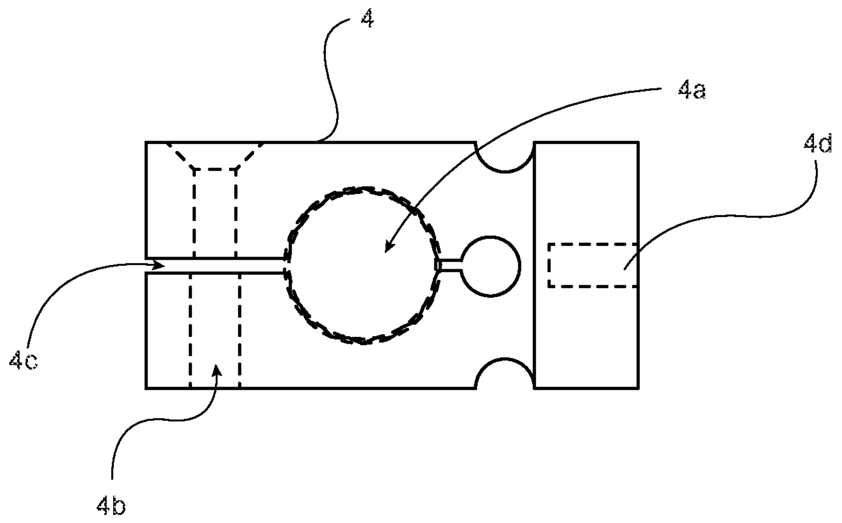
FIG. 16 is a longitudinal side elevation view of a hub portion clamp, in accordance with one embodiment of an extremity support system of the present invention.
Figure 17:
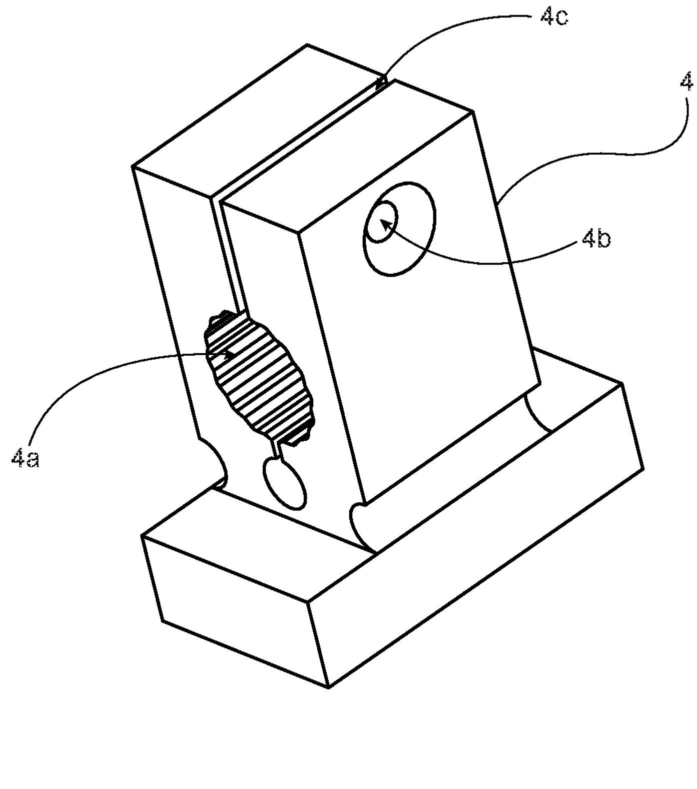
FIG. 17 is a top perspective view of a hub portion clamp, in accordance with one embodiment of an extremity support system of the present invention.
Figure 18:
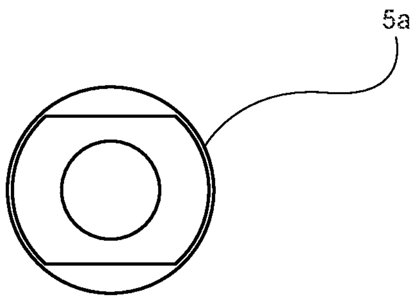
FIG. 18 is a top plan view of a lock pin housing, in accordance with one embodiment of an extremity support system of the present invention.
Figure 19:
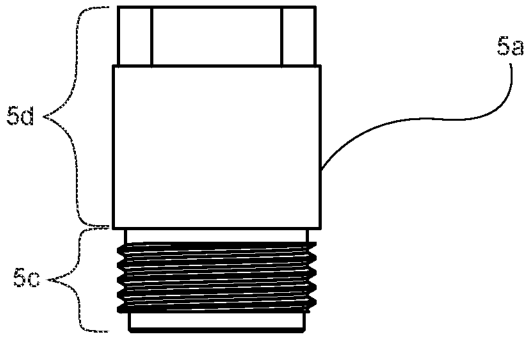
FIG. 19 is a lateral side elevation view of a lock pin housing, in accordance with one embodiment of an extremity support system of the present invention
Figure 20:
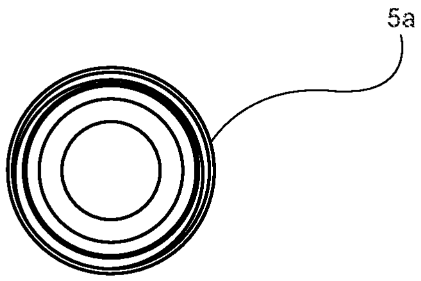
FIG. 20 is a bottom plan view of a lock pin housing, in accordance with one embodiment of an extremity support system of the present invention.
Figure 21:
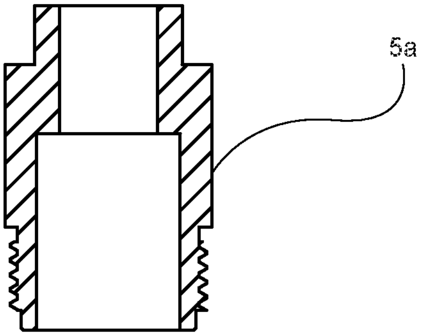
FIG. 21 is a longitudinal sectioned view, along line A-A of FIG. 19, of a lock pin housing, in accordance with one embodiment of an extremity support system of the present invention.
Figure 22:
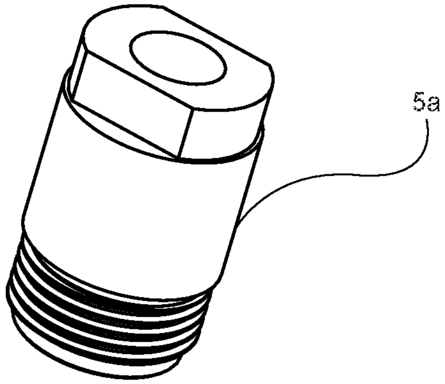
FIG. 22 is a top side perspective view of a lock pin housing, in accordance with one embodiment of an extremity support system of the present invention.
Figure 23:
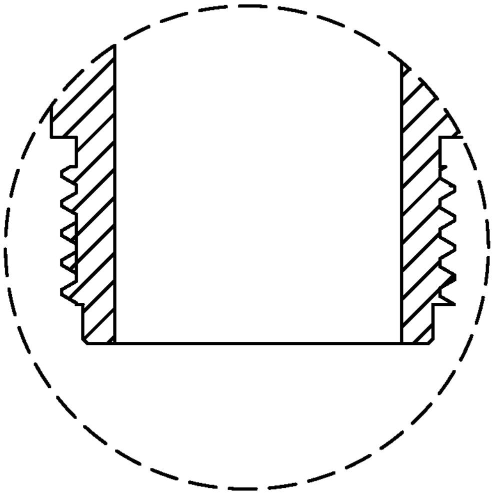
FIG. 23 is detailed view of FIG. 22, showing a detail of the threaded end of a lock pin housing, in accordance with one embodiment of an extremity support system of the present invention.

FIGS. 14-17 show various views of one of the hub portion clamp 4 showing principal support aperture 4*a*, slit 4*c* and screw aperture 4*b* that cooperate to capture and hold in place a support rod (not shown) sized so as to fit within support aperture 4*a* such that slit 4*c* that may be closed by action of a screw (not shown) extending through screw aperture 4*b*. The support rod in turn to be attached to or integrated into a stand or other mechanical support that in turn may be attached to a chair or bed. FIG. 16 also shows hub portion clamp screw apertures, such as aperture 4*d*, that align with hub portion clamp mounting apertures 1*c* and 1*d* that may accept a fixture, such as a screw, to attach hub portion clamp 4 to hub portion 1.

It will also be appreciated that hub portion clamp 4 may be integrated into hub portion 1 as a single piece by machining this arrangement from a single piece of metal.

FIGS. 18-23 show various views of a lock pin housing, such as lock pin housing 5*a*, having a threaded portion 5*c* that screws into threads provided in locking pin aperture 1*g*. Likewise, lock pin housing 5*b* is provided with a threaded portion that screws into threads provided in locking pin aperture 1*h*.

Figure 24:
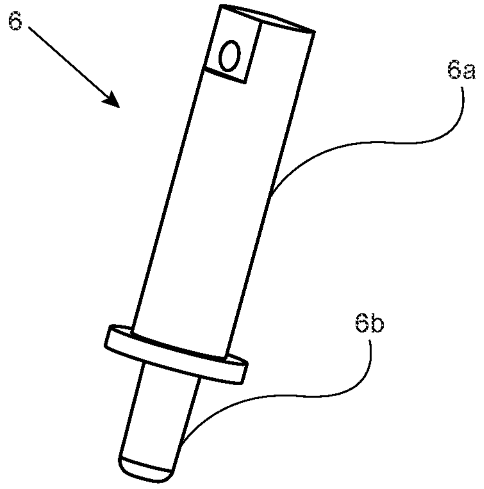
FIG. 24 is a top side perspective view of a lock pin, in accordance with one embodiment of an extremity support system of the present invention.
Figure 25:
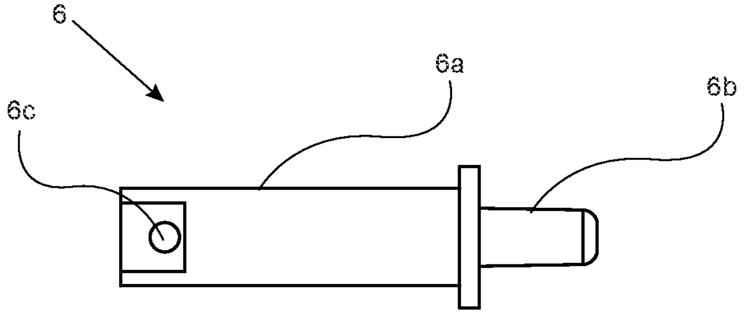
FIG. 25 is a lateral view of a lock pin, in accordance with one embodiment of an extremity support system of the present invention.
Figure 26:
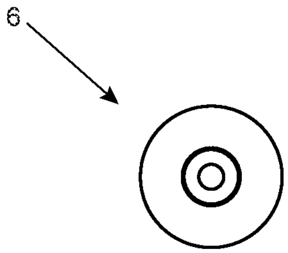
FIG. 26 is a distal end view of a lock pin, in accordance with one embodiment of an extremity support system of the present invention.
Figure 27:
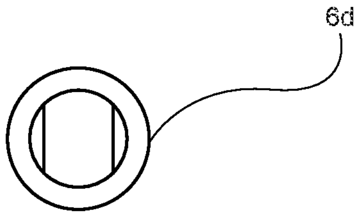
FIG. 27 is a plan view of a lock pin ring, in accordance with one embodiment of an extremity support system of the present invention.
Figure 28:
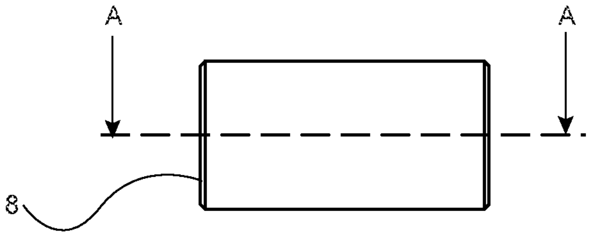
FIG. 28 is a lateral view of an inner bushing, in accordance with one embodiment of an extremity support system of the present invention.
Figure 29:
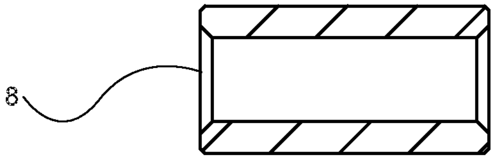
FIG. 29 is a longitudinal sectioned view, along line A-A of FIG. 28, of an inner bushing, in accordance with one embodiment of an extremity support system of the present invention.
Figure 30:
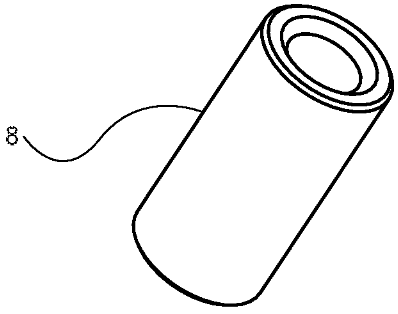
FIG. 30 is a top side perspective view of an inner bushing, in accordance with one embodiment of an extremity support system of the present invention.
Figure 31:
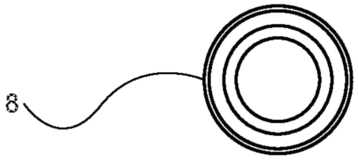
FIG. 31 is a longitudinal end view of an inner bushing, in accordance with one embodiment of an extremity support system of the present invention.
Figure 32:
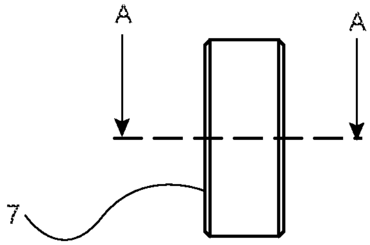
FIG. 32 is a lateral view of an outer bushing, in accordance with one embodiment of an extremity support system of the present invention.
Figure 33:
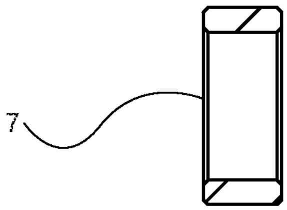
FIG. 33 is a longitudinal sectioned view, along line A-A of FIG. 28, of an outer bushing, in accordance with one embodiment of an extremity support system of the present invention.
Figure 34:
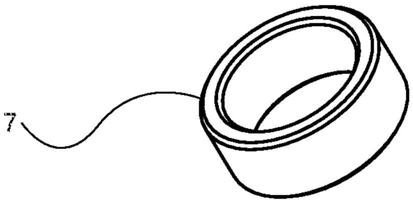
FIG. 34 is a top side perspective view of an outer bushing, in accordance with one embodiment of an extremity support system of the present invention.
Figure 35:
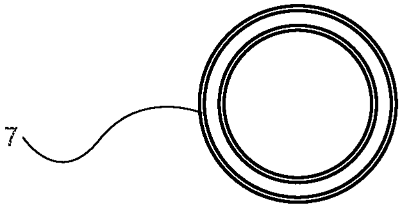
FIG. 35 is a longitudinal end view of an outer bushing, in accordance with one embodiment of an extremity support system of the present invention.

FIGS. 24-26 show various views of locking pin 6 having a main body portion 6*a* and a locking extension portion 6*b* (with pull ring aperture 6*c* to accept a pull ring 6*d*) that in turn is sized so to be able to extend into locking apertures 2*f* as may be as may be appreciated from FIGS. 11 through 13, to be able to fix one or both of the lateral support arms 2*a* and 2*b* in a determined position so as to be movably adjustable respectively about rotation axes D1 and D2 (as may be appreciated from FIGS. 2-4), i.e., along respective arcs C1 and C2, to provide an adjustable extremity support wherein the extremity support member suspended from the lateral support arm(s) may be adjusted in its position with respect to horizontal plane. The lateral support arms 2*a* and 2*b* may be independently rotated along respective arcs C1 and C2 and, once the desired position(s) is/are determined, the locking pin(s) 6 are extended into one of the locking apertures, such as locking aperture 2*f*, to fix the angle of the lateral support arm(s) with respect to the central axis A.

FIGS. 28-31 show various views of inner bushing 8.

FIGS. 32-35 show various views of outer bushing 7.

Figure 36:
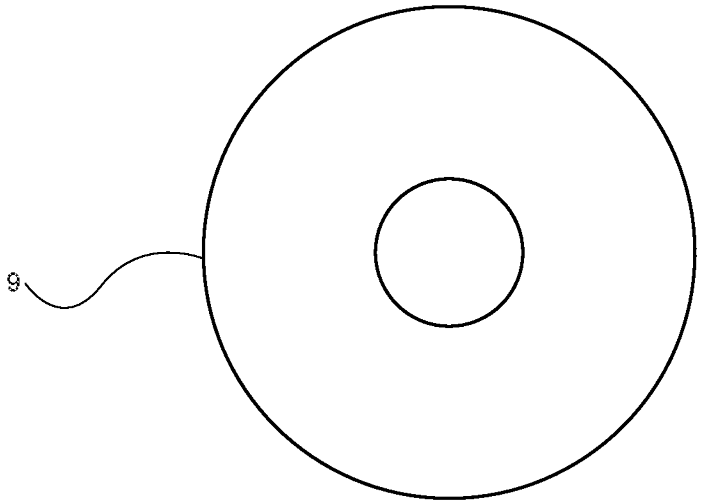
FIG. 36 is a plan view of a washer, in accordance with one embodiment of an extremity support system of the present invention.
Figure 37:
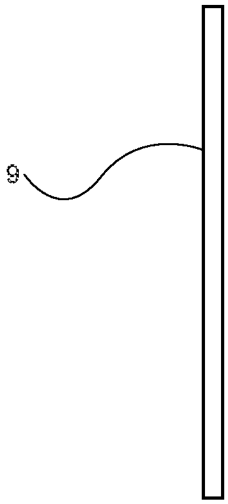
FIG. 37 is a lateral view of a washer, in accordance with one embodiment of an extremity support system of the present invention.

FIGS. 36 and 37 show various views of washer ring 9.

Figure 38:
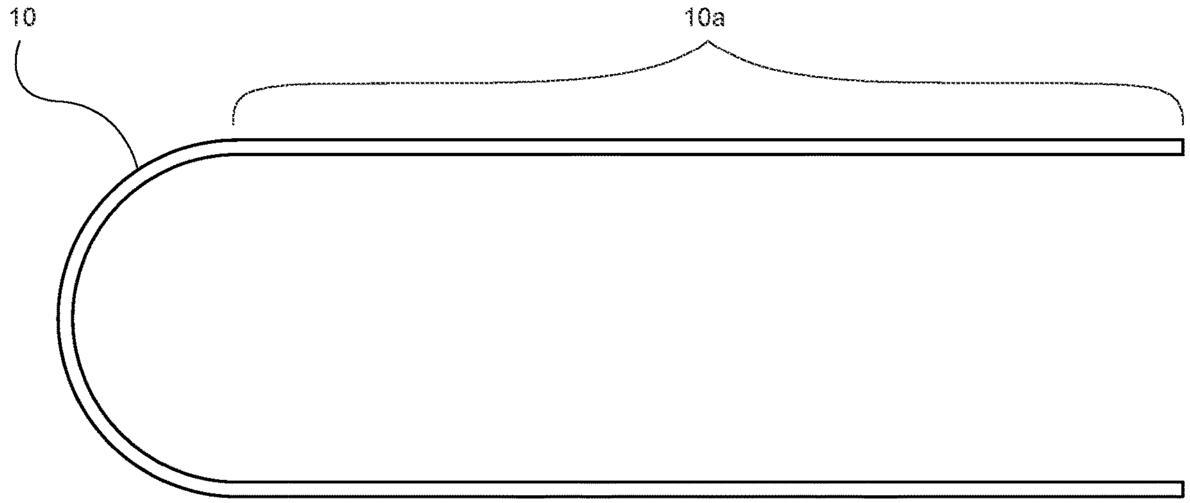
FIG. 38 is a plan view of a relatively larger U-rod, in accordance with one embodiment of an extremity support system of the present invention.
Figure 39:
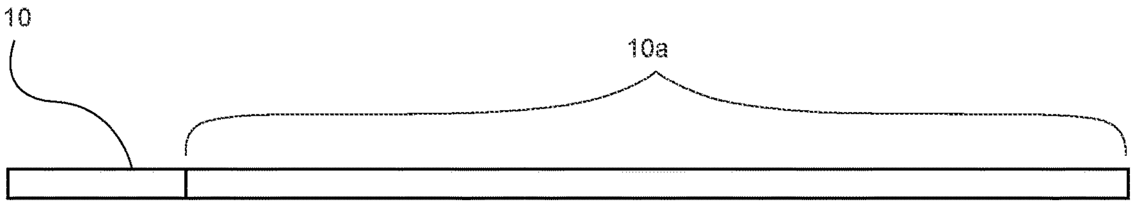
FIG. 39 is a lateral view of a relatively larger U-rod, in accordance with one embodiment of an extremity support system of the present invention.

FIGS. 38 and 39 show various views of a relatively large U-shaped rod 10, typically of a plastic or other polymeric material, that may be used to form the extremity support member of the extremity support system of the present invention. FIGS. 38 and 39 show relatively large U-shaped rod 10 having a lateral portion 10*a* that comprises a substantially parallel set of rods over or around which a fabric may be tensed to create a tensed fabric surface.

Figure 40:
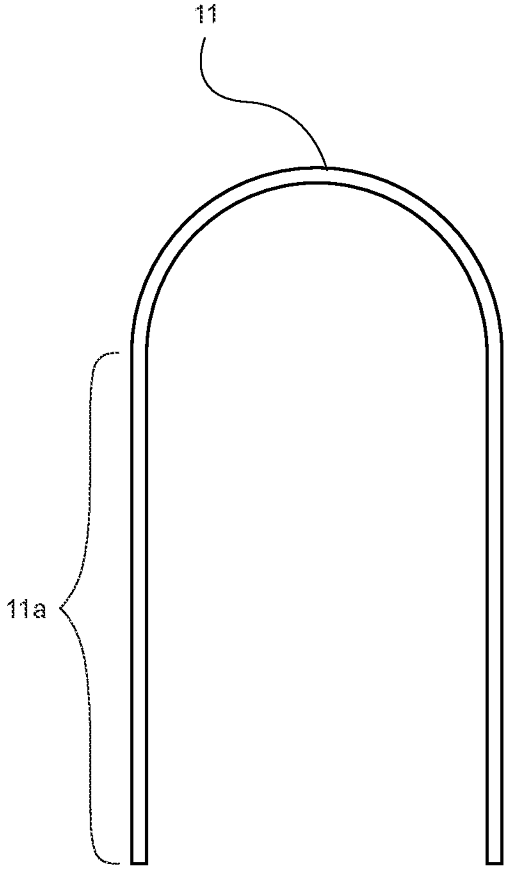
FIG. 40 is a plan view of a relatively smaller U-rod, in accordance with one embodiment of an extremity support system of the present invention.
Figure 41:
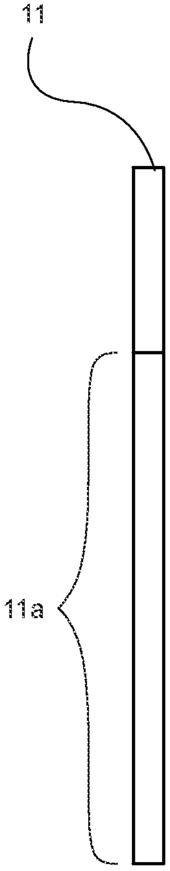
FIG. 41 is a lateral view of a relatively smaller U-rod, in accordance with one embodiment of an extremity support system of the present invention.

FIGS. 40 and 41 show various views of a relatively smaller U-shaped rod 11, typically of a plastic or other polymeric material, that may be used to form the extremity support member of the extremity support system of the present invention. FIGS. 40 and 41 show relatively small U-shaped rod 11 having a lateral portion 11*a* that comprises a substantially parallel set of rods over or around which a fabric may be tensed to create a tensed fabric surface.

Figure 42:
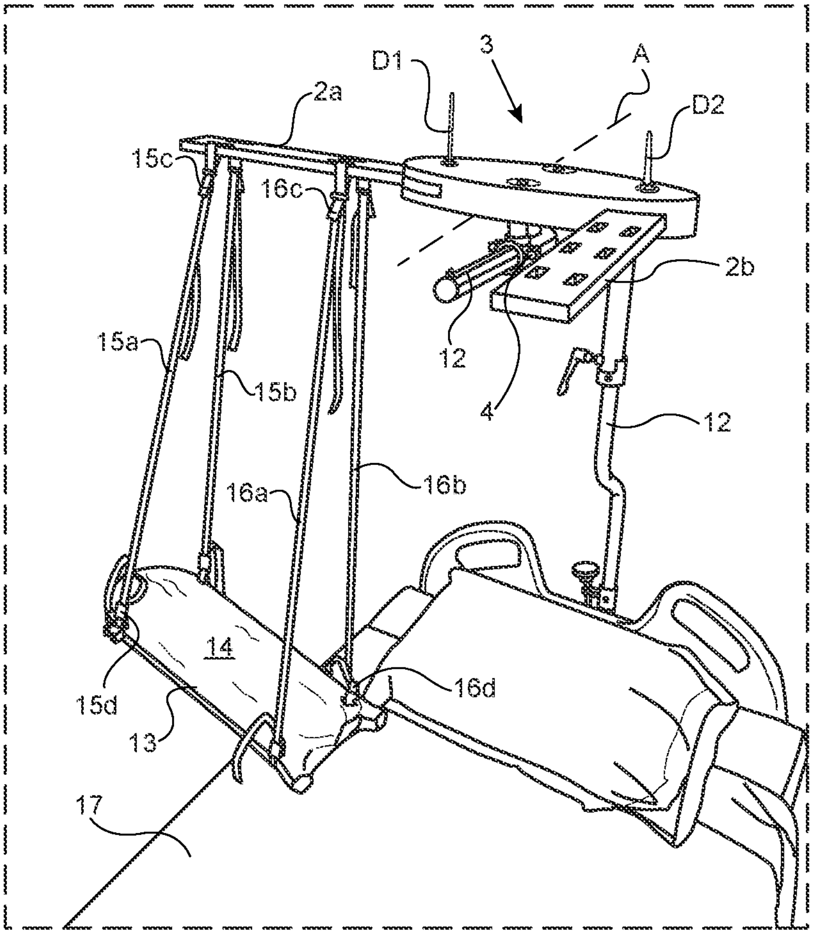
FIG. 42 is an overhead perspective view of an extremity support system for providing an extremity support suspension on at least one side of a patient support, such as a hospital bed, in accordance with one embodiment of the present invention.
Figure 43:
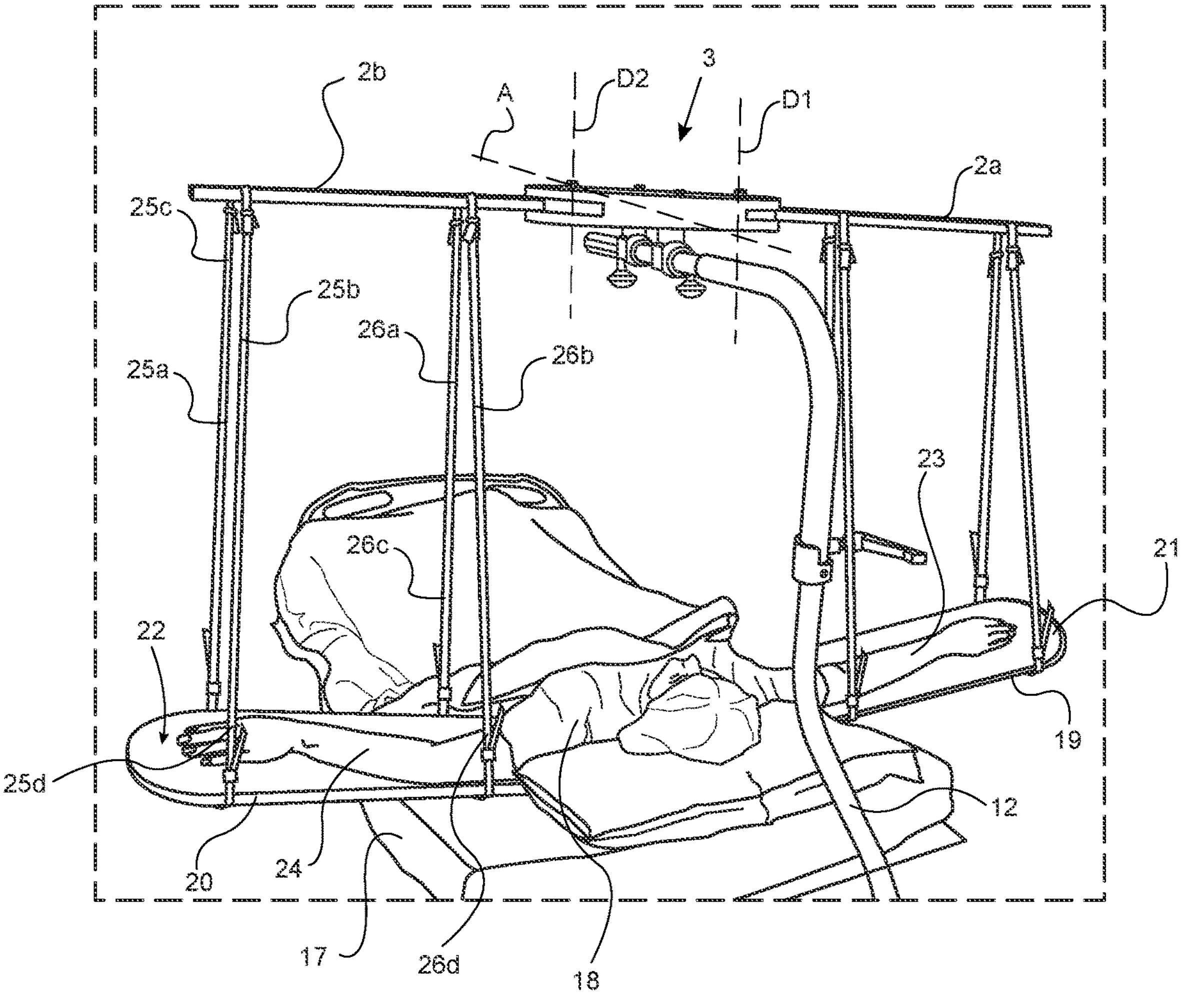
FIG. 43 is an overhead perspective view of an extremity support system for providing an extremity support suspension on both sides of a patient support, such as a hospital bed supporting a patient, in accordance with another embodiment of the present invention.

U-shaped rods 10 and/or 11 may be used in the system of the present invention by stretching a fabric over them to create a tensed fabric surface upon which the patient's arm or leg may be placed, as may be appreciated from FIGS. 42 and 43. U-shaped rods 10 and/or 11 may be applied independently in accordance with the size and length of the patient's affected extremity, such as the patient's arm or forearm, as may be appreciated from FIGS. 42 and 43.

The longitudinal side of the U-shaped rods 10 and/or 11 may be attached to the support straps or ropes as shown in FIGS. 42 and 43. Other variations of this component of this embodiment of the present invention may include similar frames or other shapes to which may be attached similar fabrics to provide a tensed fabric surface for the extremity support member. Still variations of this component of this embodiment of the present invention may include rigid planar materials, such as wood, plastic, composite or metal planar panels that may be used as a substitute for the tensed-fabric frames, to provide a rigid planar surface as the extremity support member.

FIG. 42 is an overhead perspective view of an extremity support system for providing an extremity support suspension on at least one side of a patient support, such as a hospital bed, in accordance with one embodiment of the present invention. FIG. 42 shows support rod 12 attached to the hub portion assembly 3 comprising a hub portion 1 attached to hub portion clamp (in this variant attached to the bottom of hub portion 1) from which lateral support arms 2*a* and 2*b* extend and are movably attached so as to be positioned at various angles with respect to its central axis A (typically oriented along the longitudinal axis of the patient so as to place the extremities of the patient on either side of central axis A), and such that lateral support arms 2*a* and 2*b* are movably adjustable respectively about rotation axes D1 and D2 (as may be appreciated from FIGS. 2-4), i.e., along respective arcs C1 and C2 shown in FIG. 1, to provide an adjustable extremity support system of the present invention. This variant of the invention is shown with only one extremity support member 13 formed by U-shaped rod 10 having a stretched or tensed fabric cover 14 over them to create a tensed fabric surface upon which a patient's arm rests. Support straps 15*a*, 15*b*, 16*a* and 16*b* are arranged in pairs and are passed through slots (such as slot 2*c* in lateral support arm 2*a* (and slot 2*d* in lateral support arm 2*b* when utilized). The straps 15*a*, 15*b*, 16*a* and 16*b* are also attached to the U-shaped rod 10 as well. The straps 15*a*, 15*b*, 16*a* and 16*b* may also be provided with fixtures such as buckles 15*c*, 15*d*, 16*c* and 16*d* and the like to permit their individual lengths to be varied such that the operator may vary the pitch and yaw of the extremity support member 13 as may be desired for patient comfort while supported on bed 17.

FIG. 42 is an overhead perspective view of an extremity support system for providing an extremity support suspension on one side of a patient support, such as a hospital bed 17, in accordance with one embodiment of the present invention. FIG. 42 shows support rod 12 attached to the hub portion assembly 3 comprising a hub portion 1 attached to hub portion clamp (in this variant attached to the bottom of hub portion 1) from which lateral support arms 2*a* and 2*b* extend and are movably attached so as to be positioned at various angles with respect to its central axis A (typically oriented along the longitudinal axis of the patient so as to place the extremities of the patient on either side of central axis A), and such that lateral support arms 2*a* and 2*b* are movably adjustable respectively about rotation axes D1 and D2 (as may be appreciated from FIGS. 2-4), i.e., along respective arcs C1 and C2 shown in FIG. 1, to provide an adjustable extremity support system of the present invention. This variant of the invention is shown with only one extremity support member 13 formed by U-shaped rod 10 having a stretched fabric cover 14 over them to create a fabric surface upon which a patient's arm rests. Support straps 15*a*, 15*b*, 16*a* and 16*b* are arranged in pairs and are passed through slots (such as slot 2*c* in lateral support arm 2*a* (and slot 2*d* in lateral support arm 2*b* when utilized). The straps 15*a*, 15*b*, 16*a* and 16*b* are also attached to the U-shaped rod 10 as well. The straps 15*a*, 15*b*, 16*a* and 16*b* may also be provided with fixtures such as buckles and the like to permit their individual lengths to be varied such that the operator may vary the pitch and yaw of the extremity support member 13 as may be desired for patient comfort. The straps 15*a*, 15*b*, 16*a* and 16*b* may also be provided with quick release fixtures such as snap buckles disposed along their length to permit the individual straps to be released such that the operator may more readily free the patient's extremity from the extremity support member(s) as may be desired to permit the patient to conveniently leave the patient support for ancillary care, imaging, etc.

It will be appreciated from the following description that the hub portion assembly 3 may comprise a hub portion 1 adapted to support and permit the adjustment of only a single lateral support arm 2*a*, so as to provide a single-sided variant.

FIG. 43 is an overhead perspective view of an extremity support system for providing an extremity support suspension on both sides of a patient 18 on a patient support, such as a hospital bed 17, in accordance with another embodiment of the present invention. FIG. 43 shows support rod 12 attached to the hub portion assembly 3 comprising a hub portion 1 attached to hub portion clamp 4 (in this variant attached to the bottom of hub portion 1) from which lateral support arms 2*a* and 2*b* extend and are movably attached so as to be positioned at various angles with respect to its central axis A (typically oriented along the longitudinal axis of the patient so as to place the extremities of the patient on either side of central axis A), and such that lateral support arms 2*a* and 2*b* are movably adjustable respectively about rotation axes D1 and D2 (as may be appreciated from FIGS. 2-4), i.e., along respective arcs C1 and C2 shown in FIG. 1, to provide an adjustable two-sided extremity support system of the present invention. This variant of the invention is shown with two extremity support members 19 and 20 each formed by U-shaped rod 10 having a stretched or tensed respective fabric covers 21 and 22 over them to create tensed fabric surfaces upon which a patient's arms 23 and 24 rests. In this embodiment, support ropes 25*a*, 25*b*, 26*a* and 26*b* are arranged in pairs and are passed through slots (such as slot 2*c* in lateral support arm 2*a* and slot 2*d* in lateral support arm 2*b*) similar to that done with respect to straps 15*a*, 15*b*, 16*a* and 16*b* in FIG. 42. The ropes 25*a*, 25*b*, 26*a* and 26*b* are also attached to the U-shaped rod 10 forming extremity support member 20 as well. The ropes 25*a*, 25*b*, 26*a* and 26*b* may also be provided with fixtures such as slip knots 25*c*, 25*d*, 26*c* and 26*d* and the like to permit their individual lengths to be varied such that the operator may vary the pitch and yaw of the extremity support member 20 as may be desired for patient comfort while supported on bed 17. Similar slip knots may be provided in the ropes attached to another U-shaped rod 10 forming extremity support member 19 as well. Smaller U-shaped rod 11 is similar to U-shaped rod 10, and may be used to accommodate smaller extremities, such as smaller forearms.

It will be appreciated from FIGS. 42 and 43 that support straps 15*a*, 15*b*, 16*a* and 16*b* and support ropes 25*a*, 25*b*, 26*a* and 26*b* may be arranged in pairs and are passed through different slots (such as slot 2*c* in lateral support arm 2*a* and slot 2*d* in lateral support arm 2*b*) so as to change the position of the two extremity support members 19 and 20 that are suspended and held substantially parallel to the respective longitudinal axes of the lateral support arms 2*a* and 2*b* (i.e., axes B1 and B2). This arrangement permits the user to independently vary the position of the two extremity support members 19 and 20 with respect to patient 18 and to support respective patient's arms 23 and 24.

Other embodiments of the present invention include methods of supporting an extremity of a patient on a patient support by using an extremity support system of the present invention, comprising the general steps: (a) providing an extremity support system comprising: (i) a main support arm adapted to be secured above the patient support, the patient support having a central axis and first and second lateral sides, the main support comprising a hub portion connected to the support arm so as to be disposed along the central axis; (ii) A lateral support arm extending from and movably attached to the hub portion on the first lateral side, and configured for being positioned at various angles with respect to the central axis; and (iii) An extremity support member suspended from the lateral support arm; and (b) placing the patient on the patient support and placing the patient's extremity on the extremity support member.

Still other embodiments of the present invention include methods of supporting an extremity of a patient on a patient support by using an extremity support system of the present invention, comprising the steps: (a) providing an extremity support system comprising: (i) a main support arm adapted to be secured above the patient support, the patient support having a central axis and first and second lateral sides, the main support comprising a hub portion connected to the support arm so as to be disposed along the central axis, (ii) a first lateral support arm extending from and movably attached to the hub portion on the first lateral side, and configured for being positioned at various angles with respect to the central axis, (iii) a first extremity support member suspended from the first lateral support arm, (iv) a second lateral support arm extending from and movably attached to the hub portion on the second lateral side, and configured for being positioned at various angles with respect to the central axis, (v) a second extremity support member suspended from the second lateral support arm; and (b) placing the patient on the patient support and placing the patient's first extremity on the first extremity support member, and the patient's second extremity on the second extremity support member.

The methods of the present invention may be carried out by having the main support arm secured above a patient support comprising a bed or chair.

The methods of the present invention may include the additional step of changing the angle of the lateral support arm(s) with respect to the central axis, such changing the angle of at least one of the first and second lateral support arms with respect to the central axis, as may be done by adjusting the lateral support arms 2*a* and 2*b* as described herein.

The methods of the present invention may be carried out by having the extremity support member be either rigid or in the form of a tensed fabric and be suspended from the lateral support arm by a suspension arrangement having fixtures to permit the elevational and/or angular adjustment of the extremity support member, the method comprising the additional step of adjusting the elevation or angle of the extremity support member, as may be done by adjusting the straps or ropes using the buckles or slip knots as described herein.

The methods of the present invention may be carried out by having a first extremity support member be suspended from a first lateral support arm by a first suspension arrangement having fixtures to permit the elevational and/or angular adjustment of the first extremity support member, and a second extremity support member is suspended from a second lateral support arm by a second suspension arrangement having fixtures to permit the elevational and/or angular adjustment of the second extremity support member, the method comprising the additional step of adjusting the elevation or angle of at least one of the first or second extremity support members.

The methods of the present invention may be carried out by having the extremity support system comprise at least one quick release fixture to permit disconnection of the extremity support member(s), the method comprising the additional step of disconnecting the extremity support member(s) from the lateral support arm(s), as may be done by adjusting the quick release fixtures as described herein.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

What is claimed is:

1. An extremity support system for providing an extremity support suspension on at least one side of a patient support, comprising:

a. a main support arm adapted to be secured above said patient support, said patient support having a central axis and first and second lateral sides, said main support arm comprising a hub portion connected to said main support arm so as to be disposed along said central axis;

b. a lateral support arm extending from and movably attached to said hub portion on said first lateral side, and configured for being positioned at various angles with respect to said central axis;

c. an extremity support member suspended from said lateral support arm of sufficient size to support an entire length of a human arm, the extremity support member having a tensed fabric extremity support surface; and d. at least one quick release fixture to permit disconnection of said extremity support member from said lateral support arm.

2. An extremity support system according to claim 1, additionally comprising a patient support comprising a bed or chair and wherein said main support arm is secured above said patient support.

3. An extremity support system according to claim 1 wherein said lateral support arm is adapted to be variably positioned at an angle between about 0 degrees to about 115 degrees with respect to said central axis.

4. An extremity support system according to claim 3 wherein said hub portion comprises a recess and wherein said lateral support arm comprises a rigid planar member swivelably affixed within and extending from said recess so that it may be variably positioned at an angle between about 0 degrees to about 115 degrees with respect to said central axis.

5. The extremity support system according to claim 4, wherein said recess is a horizontal lateral slot.

6. An extremity support system according to claim 1, said system comprising a support suspension arrangement supporting said extremity support member.

7. An extremity support system according to claim 1 wherein said extremity support member is rigid and is of sufficient size to support a human arm.

8. An extremity support system according to claim 1 wherein said extremity support member is rigid and suspended from said lateral support arm by a suspension arrangement comprising straps, ropes or bands.

9. An extremity support system according to claim 1 wherein said extremity support member comprises a sling suspended from said lateral support arm by a suspension arrangement comprising straps, ropes or bands.

10. An extremity support system according to claim 1 wherein said lateral support arm has a longitudinal axis and wherein said straps, ropes or bands are adjustable along said longitudinal axis.

11. An extremity support system according to claim 10 additionally comprising at least one fixture to permit elevation and/or angular adjustment of said extremity support member.

12. An extremity support system according to claim 11 wherein the quick release feature is a snap buckle.

13. An extremity support system according to claim 12 additionally comprising four nylon or polypropylene straps, each strap having a fixture to permit elevation and/or angular adjustment of said extremity support member.

14. An extremity support system according to claim 10 wherein said extremity support member comprises a sling suspended from said lateral support arm by a suspension arrangement comprising straps, ropes or bands.

15. An extremity support system according to claim 14 wherein said suspension arrangement additionally comprises at least one fixture to permit elevation and/or angular adjustment of said extremity support member.

16. An extremity support system according to claim 15 wherein the quick release fixture is a snap buckle and disconnects said extremity support member from said suspension arrangement.

17. An extremity support system according to claim 16 wherein said suspension arrangement comprises four nylon or polypropylene straps each strap having a fixture to permit elevation and/or angular adjustment of extremity support member.

18. An extremity support system for providing an extremity support suspension on at least one side of a patient support, comprising:

a. a main support arm adapted to be secured above said patient support, said patient support having a central axis and first and second lateral sides, said main support arm comprising a hub portion connected to said main support arm so as to be disposed along said central axis;

b. a lateral support arm extending from and movably attached to said hub portion on said first lateral side, and configured for being positioned at various angles with respect to said central axis;

c. a rigid extremity support member of sufficient size to support an entire length of a human arm, the extremity support member having a tensed fabric extremity support surface;

d. a suspension arrangement for suspending the extremity support member from the lateral support arm;

e. the suspension arrangement having at least four straps, ropes, or bands;

f. each strap, rope, or band having a fixture to permit elevation and/or angular adjustment of said extremity support member; and g. the suspension arrangement having at least one quick release fixture to permit disconnection of said extremity support member from said lateral support arm.

* * * * *